US006538982B1

(12) United States Patent
Van Vlerken et al.

(10) Patent No.: US 6,538,982 B1
(45) Date of Patent: Mar. 25, 2003

(54) RECORD CARRIER AND APPARATUS FOR SCANNING THE RECORD CARRIER

(75) Inventors: Johannes J. L. M. Van Vlerken, Eindhoven (NL); Johannes H. M. Spruit, Eindhoven (NL); Ronald R. Drenten, Eindhoven (NL); Jakob G. Nijboer, Eindhoven (NL); Paulus G. P. Weyenbergh, Eindhoven (NL)

(73) Assignee: Koninklijke Philips Electronics, Eindhoven (NL)

( * ) Notice: Subject to any disclaimer, the term of this patent is extended or adjusted under 35 U.S.C. 154(b) by 0 days.

(21) Appl. No.: 09/490,384

(22) Filed: Jan. 24, 2000

(30) Foreign Application Priority Data

Jan. 25, 1999 (EP) .............................. 99200201
Feb. 18, 1999 (EP) .............................. 99200461

(51) Int. Cl.⁷ .............................. G11B 7/24
(52) U.S. Cl. .................. 369/275.4; 369/47.28; 369/59.2
(58) Field of Search .............. 369/275.1, 47.1, 369/47.37, 47.19, 275.3, 275.4, 44.26, 47.28, 59.2

(56) References Cited

U.S. PATENT DOCUMENTS

| 4,366,564 A | * | 12/1982 | de Haan et al. ........ 369/124.14 |
| 4,901,300 A |   | 2/1990  | Van Der Zande et al. .... 369/47 |
| 5,023,856 A | * | 6/1991  | Raaymakers et al. .... 369/275.1 |
| 5,187,699 A |   | 2/1993  | Raaymakers et al. ......... 369/48 |
| 5,828,639 A | * | 10/1998 | Kobayashi et al. ...... 369/275.3 |
| 5,999,504 A |   | 12/1999 | Aoki ........................... 369/47 |
| 6,151,281 A | * | 11/2000 | Van Der Enden et al. 369/275.3 |
| 6,181,658 B1 | * | 1/2001 | Van Den Enden et al. 369/53.29 |
| 6,201,733 B1 |   | 3/2001 | Hiraki et al. .......... 365/185.08 |
| 6,295,270 B1 | * | 9/2001 | Van Den Enden et al. 369/275.4 |

FOREIGN PATENT DOCUMENTS

| EP | 0793234 A2 | 9/1997 | ........... G11B/27/30 |
| EP | 0893794 A2 | 1/1999 | ........... G11B/7/007 |

OTHER PUBLICATIONS

ECMA Standardizing Information and Communication System, "Data Interchange on 120mm Optical Disk Using +RW Format–Capacity: 3,0 Gbytes and 6,0 Gbytes", Standard ECMA0274, $2^{nd}$ Edition, Jun. 1999.

* cited by examiner

Primary Examiner—Thang V. Tran
Assistant Examiner—Kimlien Le
(74) Attorney, Agent, or Firm—Michael E. Belk (57) ABSTRACT

A record carrier is described comprising a servo track indicating an information track intended for recording information blocks represented by marks having lengths expressed in channel bits, which servo track has a periodic variation of a physical parameter. The periodic variation is modulated for encoding record carrier information, such as addresses. The modulation is a bi-phase modulation in which a data bit of the record carrier information is encoded by a first predetermined number of variations of a first phase followed by the same number of variations of a second phase inverse to the first phase. A recording and/or playback device has a demodulator for retrieving data bits of the record carrier information from a first predetermined number of variations of a first phase followed by the same number of variations of a second phase inverse to the first phase.

26 Claims, 4 Drawing Sheets

FIG. 1b

(PRIOR ART)

ADIP word data

| Bit 0 | Set to '0' by def. |
|---|---|
| Bit 1 | Reserved |
| Bit 2..23 | 22 Address bits |
| Bit 24..31 | Auxiliary Data Byte |
| Bit 32..51 | 5 Parity nibbles |

RECORD CARRIER AND APPARATUS FOR SCANNING THE RECORD CARRIER

BACKGROUND OF THE INVENTION

1. Technical Field

The invention relates to a record carrier comprising a servo track indicating an information track intended for recording information blocks represented by marks having lengths expressed in channel bits, which servo track has a periodic variation of a physical parameter, which periodic variation is modulated for encoding record carrier information.

The invention further relates to a recording and/or playback device comprising means for writing and/or reading information blocks represented by marks having lengths expressed in channel bits in an information track on the record carrier, which device comprises means for scanning the servo track and retrieving the record carrier information.

The invention further relates to a method for manufacturing the record carrier.

2. Related Art

A record carrier and device of the type defined in the opening paragraph, for reading and/or writing information, are known from U.S. Pat. No. 4,901,300 to Van Der Zande, et al. The information is encoded into an information signal which includes time codes and may be subdivided in accordance with these time codes into information blocks, the time codes being used as addresses such as with Compact Disc Read Only Memory (CD-ROM). The record carrier has a servo track, usually called pregroove, for causing servo signals to be generated when scanning the track. A physical parameter, e.g. the radial position, of the pregroove periodically varies, constituting a so-called wobble. During the scanning of the track, this wobble leads to a variation of the servo signals. The variation is modulated by record carrier information, e.g. synchronization symbols and encoded position information, which position information indicates the absolute length of the track from the start of the track. During recording, the position of the information blocks is synchronized, as much as possible, with the synchronization symbols, so that the information blocks are written on the record carrier at a positions corresponding to their addresses.

A problem of such a system is that the pregroove wobble signal is modulated with a relatively low frequency, and thus it is hard to derive therefrom, with great accuracy and little delay, the record carrier information, e.g. the position of the read/write head, or the instants of occurrence of the synchronization symbols. In addition, the pregroove wobble signal is modulated with little intensity and, therefore, is sensitive to disc flaws.

SUMMARY OF THE INVENTION

It is an object of the invention, inter alia, to provide a record carrier and a device in which the record carrier information can be determined in a reliable, rapid and accurate manner.

According to a first aspect of the invention a record carrier as defined in the opening paragraph is characterized in that said modulation is a bi-phase modulation, in which a data bit of the record carrier information is encoded by a first predetermined number of variations of a first phase, followed by the same number of variations of a second phase inverse to the first phase. According to the invention, the recording and/or playback device as described in the opening paragraph is characterized in that the device comprises bi-phase demodulation means for retrieving data bits of the record carrier information from a first predetermined number of variations of a first phase, followed by the same number of variations of a second phase inverse to the first phase. This has the effect, that data bits can be detected independently from their value from a same number of inverted and non-inverted periodic variations. Disturbances like offset, asymmetry or cross talk can be compensated for by combining the detection signals from the inverted and non-inverted variations, (e.g. by integration). This has the advantage, that the detection has the same reliability for bits having the value 0 or 1. When compared to modulating in a single phase (e.g., invert 4 wobbles for bit=1), the bi-phase modulation has the advantage that the total number of inverted wobbles is always the same (irrespective of the data), and equal to the average number of wobbles inverted for single phase,. In a worst case situation for single phase modulation (i.e., for a series of bits=1) twice as many wobbles would be inverted. A further advantage is, that disturbance in detection of the physical location of the periodic variations, which may be used for positioning the marks when recording, is accurate, because inverted variations in a neighboring track only have a low and predictable influence when compared to random modulated variations such as the frequency modulation in the known method.

An embodiment of the record carrier characterized in that the servo track is subdivided in relatively small parts having said bi-phase modulation and relatively large parts having not-modulated (also called monotone) periodic variations. Relatively large indicates that at least 80% of the servo track has the not-modulated periodic variations, and preferably at least 90%. This has the advantage that detection of the periodic variations for positioning information blocks is not disturbed by modulation in a substantial part of the track.

A further embodiment of the record carrier is characterized in that the length of one periodic variation corresponds to a third predetermined number of channel bits. The effect is, that the nominal position of the $n^{th}$ channel bit corresponds exactly to the physical position of the $n^{th}$ periodic variation divided by the third predetermined number, because the bi-phase modulation does not influence the length of the periodic variations. This has the advantage, that the recording location can be synchronized to the periodic variations. A relatively small third predetermined number of channel bits per periodic variation allows a high accuracy of positioning. In particular, 32 is a suitable number, because this is sufficiently longer than the longest mark used in common channel coding, which are smaller than 16 channel bits, and allows easy address calculation in a binary system.

Further embodiments of the method, devices and record carrier according to the invention are given in the dependent claims.

BRIEF DESCRIPTION OF THE DRAWINGS

These and other aspects of the invention will be apparent from and elucidated further with reference to the embodiments described by way of example in the following description and with reference to the accompanying drawings, in which.

Corresponding elements in different Figures have identical reference numerals.

DETAILED DESCRIPTION OF THE EMBODIMENTS

Figure 1A:
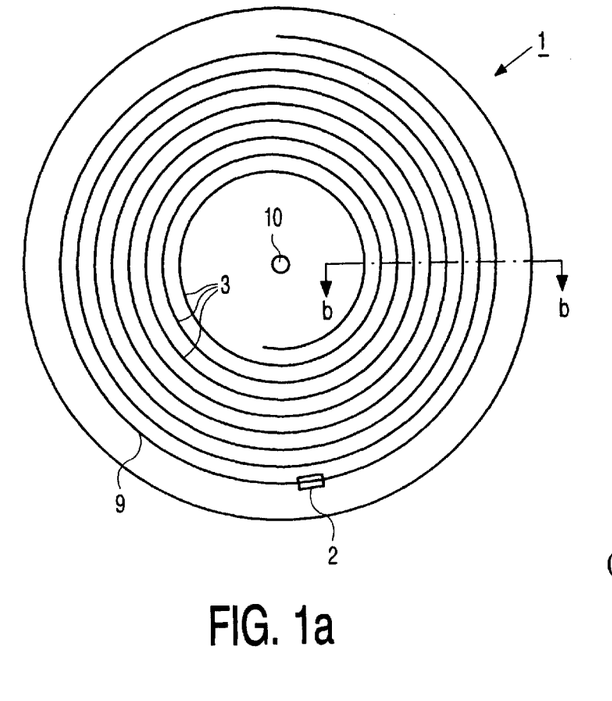
FIGS. 1*a*–1*d* show a record carrier, of the related art.
Figure 1B:
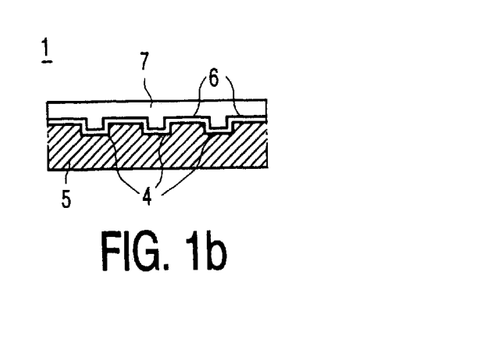
Figure 1C:
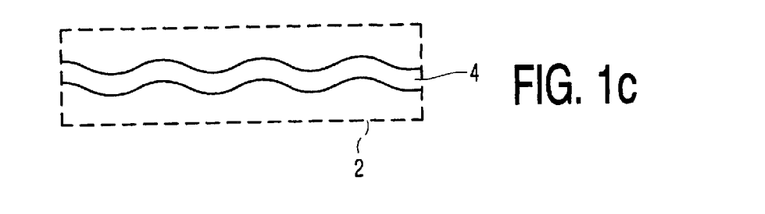
Figure 1D:
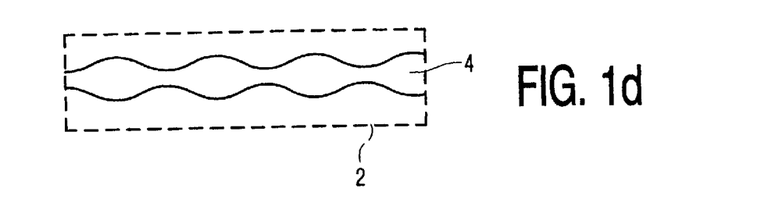

FIG. 1a shows a disc-shaped record carrier 1 which comprises a continuous track 9 intended for recording, which track is arranged in a spiral pattern of windings 3 about center point 10. The windings may also be arranged concentrically instead of spirally. The track 9 on the record carrier is indicated by a servo track in which, for example, a pregroove 4 enables a read/write head during scanning to follow the track 9. A servo track may also be formed, for example, by regularly spread sub-tracks which, in the servo track system, periodically cause signals to occur. FIG. 1b shows a cross-section along a line b—b of the record carrier 1, in which a transparent substrate 5 is covered by a recording layer 6 and a protective layer 7. The pregroove 4 may also be arranged as a land or be a material property that differs from its environment. The recording layer 6 may be deposited in an optical manner, magneto-optical or magnetic manner by an apparatus for reading and/or writing information such as the known Compact Disc (CD) recordable or hard disc for computer use. FIGS. 1c and 1d show two examples of a periodic modulation (i.e., wobble) of the pregroove. This wobble causes an additional signal to arise in a servo track recorder. In the related art, the wobble is, for example, frequency modulated and disc information is modulation encoded. A comprehensive description of the inscribable CD system comprising disc information obtained in such a manner can be found in U.S. Pat. No. 4,901,300 to Van Der Zande, et al. and U.S. Pat. No. 5,187,699 to Raaymakers, et al. incorporated herein by reference.

Figure 2:
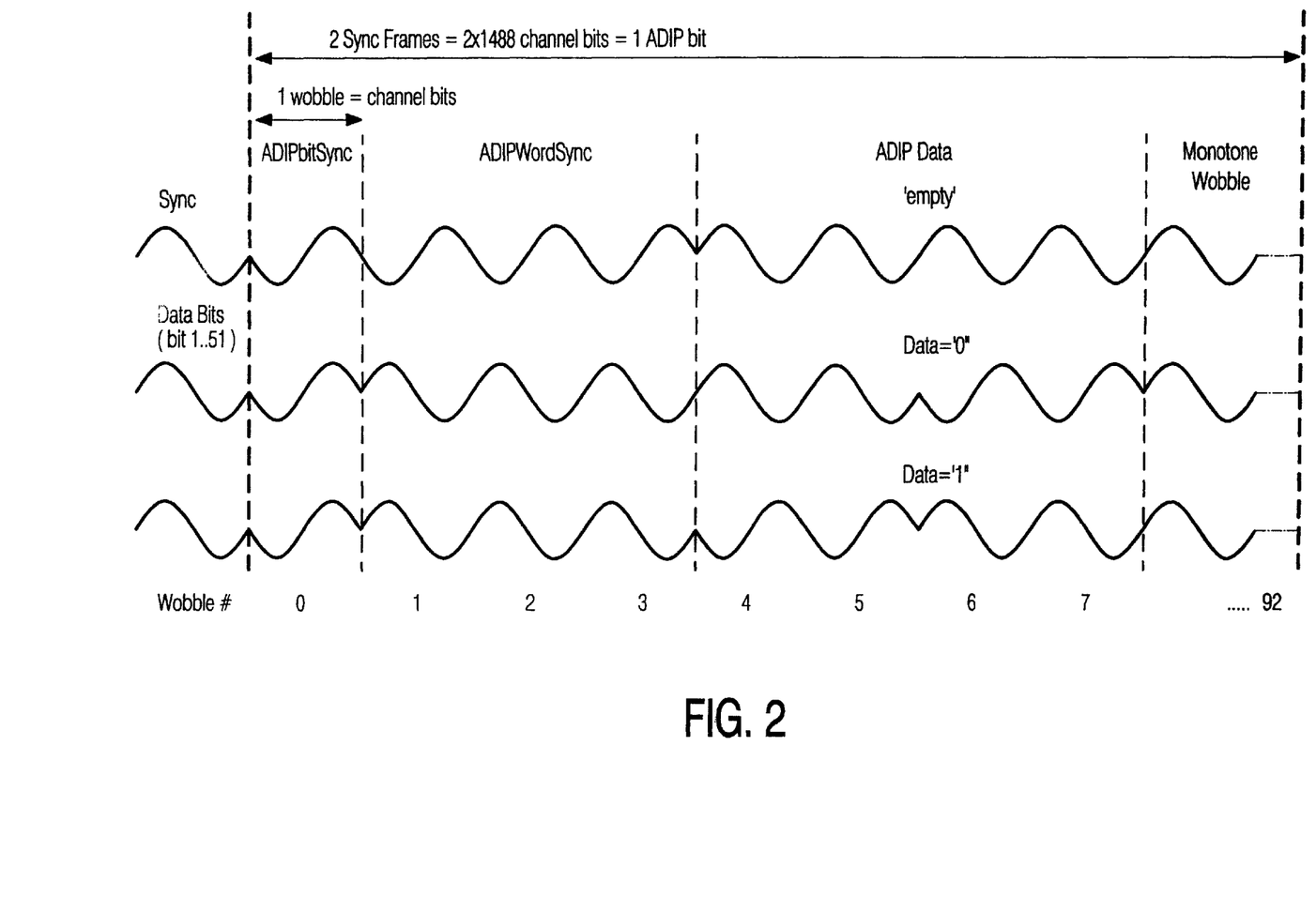
FIG. 2 shows bi-phase wobble modulation.

FIG. 2 shows bi-phase wobble modulation. An upper trace shows the wobble modulation for a word sync pattern, a second and third trace show the wobble modulations for data bits (one out of Data Bits 1 to 51). Predetermined phase patterns are used for indicating a synchronizing symbol (i.e., ADIP bit sync), and a synchronization of the full address word (i.e., ADIP word sync), and for the respective data bits (i.e., ADIP Data='0', and ADIP data='1'). The ADIP bit sync is indicated by a single inverted wobble (i.e., wobble #0). The ADIP word sync is indicated by three inverted wobbles directly following the ADIP bit sync, whereas data bits have non-inverted wobbles in this area (i.e., wobble #1 to 3). An ADIP Data area comprises a number of wobble periods assigned to represent one data bit, in FIG. 2 the wobble periods numbered 4 up to 7 (=wobble #4 to 7). The wobble phase in first half of the ADIP Data area is inverse to the wobble phase in the second half of the area. As such each bit is represented by two sub-areas having different phases of the wobble, (i.e. called bi-phase). Data bits are modulated as follows: ADIP Data='0' is represented by 2 non-inverted wobbles followed by two inverted wobbles, and ADIP data='1' vice versa. In this embodiment the modulation for data bits is fully symmetrical, giving equal error probability for both data bit values. However, other combinations of wobbles and inverted wobbles, or other phase values may be used. In an embodiment, a predetermined modulation is used after a ADIP Word Sync, indicating 'empty', instead of a data bit. Monotone wobbles may be used after the first data bit, or further data bits may be encoded thereafter. In one embodiment, a large majority of the wobbles is not-modulated (i.e. has the nominal phase) for ensuring an easy lock and a stable output of a Phase Locked Loop (PLL) in a detector (see FIG. 4). In this embodiment, the 8 possibly modulated wobbles are followed by 85 not-modulated (i.e. monotone) wobbles (i.e., wobble #8 to 92). The output frequency of the PLL has to be as stable as possible, because during writing the write clock is derived from the PLL output.

By applying the bi-phase modulation, the following ADIP detection results are found experimentally. Good bit synchronization can be done, and attainable ADIP Bit error rates are sufficiently low. The decision level is zero, in spite of the fact that inverted wobbles may have a different (e.g. lower) average amplitude, because the detection is symmetrical for bit=0 and bit=1, (i.e. the integration interval covers, in both cases, a number of non-inverted wobbles and a number of inverted wobbles). By applying 2×2 wobbles and bi-phase modulation the detection margins for the data bits are sufficient in worst case situations. ADIP word sync uses 3 inverted wobbles followed by an empty area of 4 wobbles (i.e., no data bit modulated after the word sync), which results in reliable word sync.

The results indicate that the bi-phase modulation improves detection of the address from the servo track.

Figure 3:
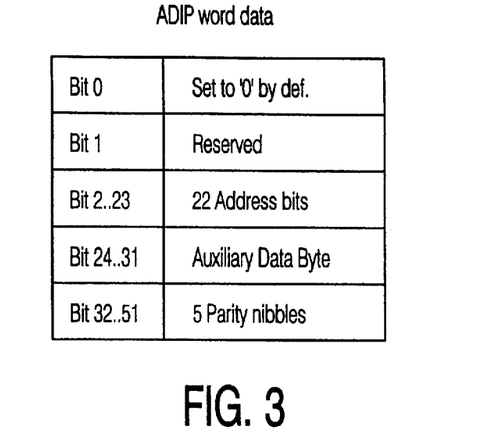
FIG. 3 shows Address In Pregroove (ADIP) word data.

FIG. 3 shows ADIP word data. An ADIP word comprises 52 bits, which corresponds to 52*93 wobbles, and 1 wobble=32 channel bits. For the Digital Video Disc (DVD) format, a an channel code Eight-to-Fourteen Modulation Plus (EFM+) is used, and channel bits are clustered in Eight-to-Fourteen Modulation (EFM) sync frames of 1488 channel bits. Hence one ADIP bit corresponds to 2 EFM sync frames, and the ADIP word corresponds to 4 sectors in the DVD format. An Error Correction Code (ECC) block in the DVD format comprises 16 sectors, hence an ECC block corresponds to 4 ADIP words. So, one ADIP Word Sync is used every fourth sector to indicate the start of a new address (i.e. a new full ADIP word). The table shows the use of the data bits for the full address word for indicating a sector addresses, (e.g. a DVD sector address). The address is given by the actual DVD sector addresses on that position (i.e. the 22 Most Significant Bits of the 24 bit address). Hence the lowest two bits of the address are always fixed and can be used for different purposes. Bit 0 is always set to 0, and not actually modulated as indicated in FIG. 2 by the 'empty' area after the ADIP Word Sync. Bit 1 is reserved for future use. Further it is to be noted, that ECC symbols are added (i.e., bits 32–51) based on nibbles (i.e., =4 bit words) according to a Reed Solomon (RS) error code as follows: 8 data nibbles have 5 parity nibbles. This further improves the reliability of the address detection. In one an embodiment, the parity nibbles are inverted after calculation (and again inverted when used). This prevents long sequences of zeroes when data nibbles are zero.

Figure 4:
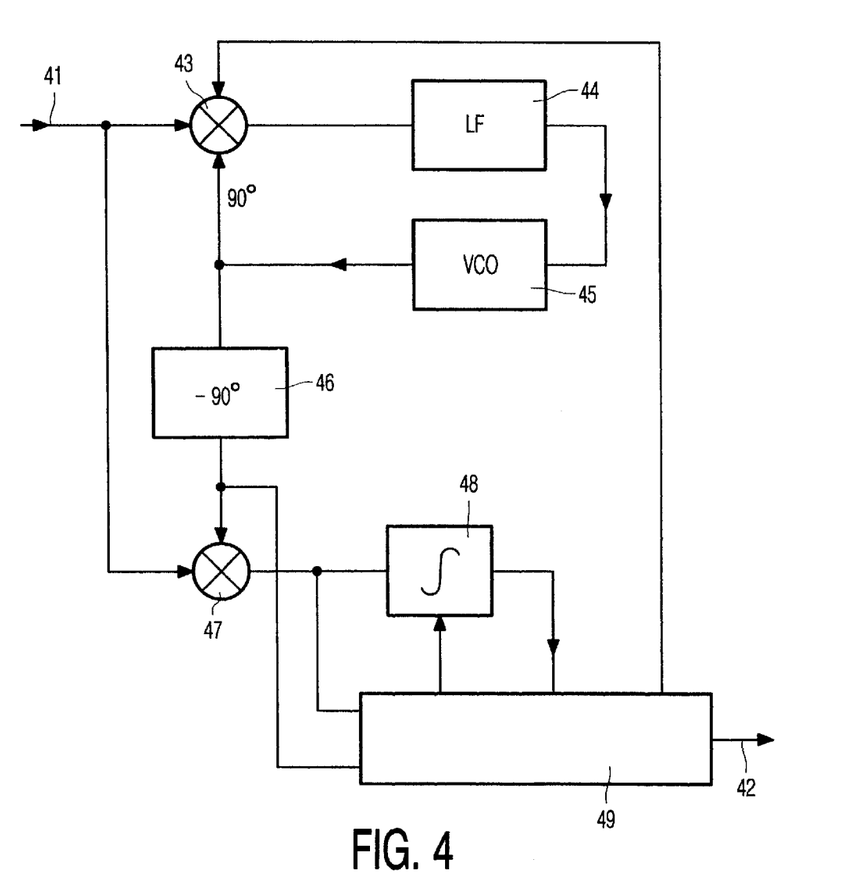
FIG. 4 shows a bi-phase detector.

FIG. 4 shows a detector for bi-phase modulation. The detector constitutes an example of bi-phase demodulation means for retrieving data bits of the record carrier information from a first predetermined number of variations of a first phase, followed by the same number of variations of a second phase inverse to the first phase, and may be part of the address detector 50 as described below for the writing and/or reading device shown in FIGS. 5 and 6. An input signal 41 that corresponds to the modulated wobble of the track, is derived from an optical detector in a read head which detects the lateral position of the track. An upper loop constituted by multiplier 43, a loop filter 44 (LF) and a voltage controlled oscillator 45 (VCO) operates like a phase locked loop (PLL). The loop filter 44 comprises an integrating element and a proportional element, as in a conventional PLL. The output of the VCO is 90 degrees out of phase with the nominal wobble phase (i. e. without modulation), and is coupled to a phase shifter of −90 degrees 46. So, when the input signal is a sine corresponding to the wobble, the output of VCO 45 is a cosine, and the phase shifter output is a sine again. The output of the phase shifter 46 and the input signal 41 are coupled to multiplier 47 for multiplying to a quadrature signal coupled to a controllable integrator 48. The output of the integrator 48 is coupled to a bit detector 49, which provides a bit output signal 42. For synchronous detection, the output of phase shifter 46 is also coupled to the bit detector 49 to allow determination of the nominal position of zero crossings of the input signal and control the integrator at the begin and end of the wobbles.

The function of the bit detector 49 is as follows. First the ADIP bit sync is detected from the quadrature signal for bit synchronization. The bit detector may control integrator 48 (or may have a separate synchronous detector) for detecting an inverted wobble after a relatively long sequence of non-inverted wobbles preceding each ADIP bit sync. In an embodiment the bit detector may be provided with a confidence counter, which is incremented each time an ADIP bit sync is detected on an expected location (i.e. one out of every 93 wobbles, see FIG. 2) up to a maximum count value, e.g. 16. If no ADIP bit sync is detected on such location, the counter is decreased. As soon as a predefined level (e.g. the maximum level) is achieved a bit synchronization is assumed. Then the integrator 48 is controlled by the bit detector 49 to integrate the quadrature signal over the ADIP Data interval, and to invert the sign of the integration halfway. This results in a maximum integrator output for a data bit 0, and a maximum inverse output for a data bit 1. For word synchronization the ADIP word sync is detected by detecting the 3 inverted wobbles after the ADIP bit sync, and preferably also the 'empty' area. In an embodiment the integrator may be controlled to start integrating at the ADIP bit sync, and after 4 wobbles, if the integrated value indicates the ADIP word sync, integrate the empty area with inverted sign. As such the ADIP word sync together with the 'empty' area constitute a bi-phase modulated area, resulting in a robust detection of the word sync. Alternatively a second integrator may be used just for detecting the word sync.

It can be seen that modulated bits do not contribute or even disturb the PLL phase, as the PLL has to lock on the nominal phase of the wobble. In a PLL for the above bi-phase modulation (i.e., using phase=zero or 180 degrees) such disturbance may ignored, because the disturbance of an inverted wobble is small as the zero crossings are on the same location (although inverted). In a digital embodiment of the PLL it may be limited by just processing the signal around the zero crossing of the wobble. In an embodiment of the detector the PLL is also controlled by the bit detector 49 via control signal 40 to constitute a decision directed PLL. The control signal 40 may be coupled to the multiplier 43 (as shown) or may be coupled to a controllable switch or inverter before the loop filter 44. The control signal may indicate to skip the signal of modulated wobbles, or to actually invert the modulated wobbles so as to have the right sign for contributing in a constructive way to the phase error signal generation of the PLL. A delay element, (e.g. of a few wobble periods), may be included before the PLL loop to allow some time for the bit detector to actually detect the modulated wobbles and generate the control signal 40.

Figure 5:
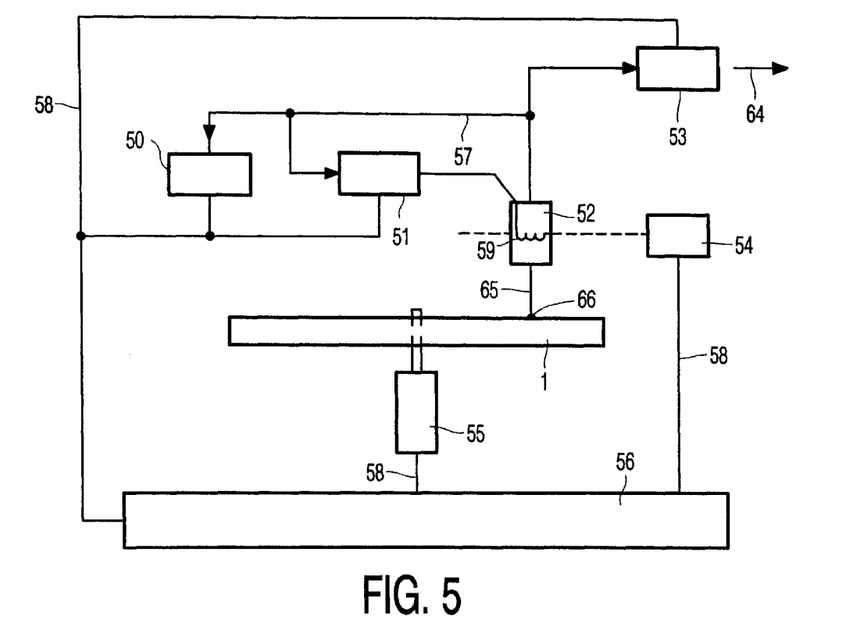
FIG. 5 shows a playback device.
Figure 6:
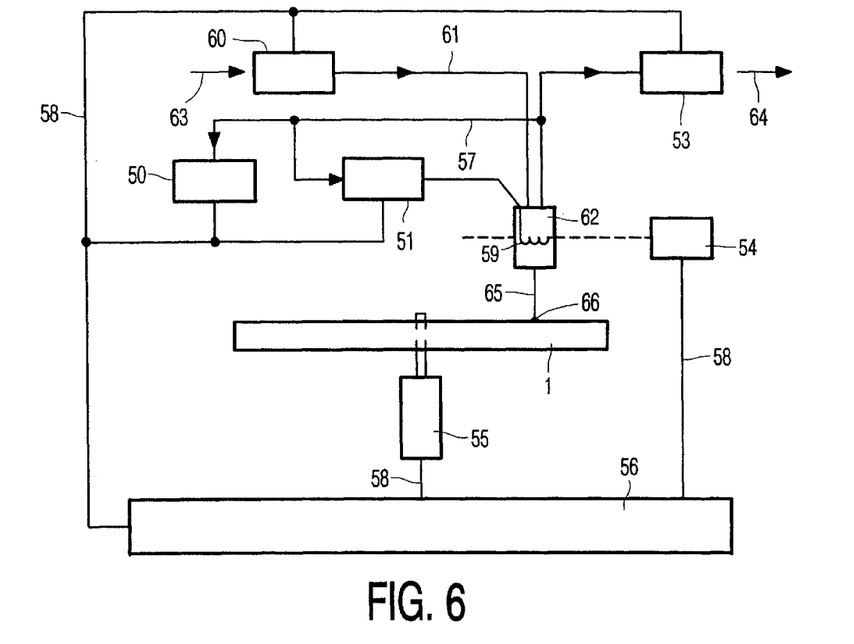
FIG. 6 shows a recording device.

FIGS. 5 and 6 show apparatuses according to the invention for scanning a record carrier 1. Writing and reading of information on optical discs, and formatting, error correcting and channel coding rules, are well-known in the art, (e.g. from the CD system). The apparatus of FIG. 5 is arranged for reading the record carrier 1, which record carrier is identical to the record carriers shown in FIG. 1. The device is provided with a read head 52 for scanning the track on the record carrier and read control means comprising drive unit 55 for rotating the record carrier 1, a read circuit 53, for example, comprising a channel decoder and an error corrector, tracking unit 51, and a system control unit 56. The read head comprises optical elements of the usual type for generating a radiation spot 66 focused on a track of the recording layer of the record carrier via a radiation beam 65 guided through optical elements. The radiation beam 65 is generated by a radiation source, (e.g. a laser diode). The read head further comprises a focusing actuator for focusing the radiation beam 65 on the recording layer and a tracking actuator 59 for fine positioning of the spot 66 in radial direction on the center of the track. The apparatus has a positioning unit 54 for coarsely positioning the read head 52 in the radial direction on the track. The tracking actuator 59 may comprise coils for radially moving an optical element or may be arranged for changing the angle of a reflecting element on a movable part of the read head or on a part on a fixed position in the case part of the optical system is mounted on a fixed position. The radiation reflected by the recording layer is detected by a detector of a usual type, (e.g. a four-quadrant diode), for generating a detector signals 57 including a read signal, a tracking error and a focusing error signal. The tracking unit 51 is coupled to the read head for receiving the tracking error signal from the read head and controlling the tracking actuator 59. During reading, the read signal is converted into output information, indicated by arrow 64, in the read circuit 53. The apparatus is provided with an address detector 50 for detecting and the retrieving address information from the detector signals 57 when scanning the servo track of the record carrier. The device is further provided with a system control unit 56 for receiving commands from a controlling computer system or from a user and for controlling the apparatus via control lines 58, e.g. a system bus connected to the drive unit 55, the positioning unit 54, the address detector 50, the tracking unit 51 and the read circuit 53. To this end, the system control unit comprises control circuitry, for example, a microprocessor, a program memory and control gates, for performing the procedures described below. The system control unit 56 may also be implemented as a state machine in logic circuits. The read device is arranged for reading a disc having tracks having a periodic variation, (e.g. a continuous wobble). The read control unit is arranged for detecting the periodic variations and for reading in dependence thereon a predetermined amount data from the track. In an embodiment, the read clock is synchronized to the periodic variations and the read circuit 53 reads a fixed number of channel bits for each instance of the periodic variations. In an embodiment, the read control means are arranged for retrieving the data from an area of the track following an unrecorded area. In the read circuit 53 the read clock is synchronized to the periodic variations in the unrecorded area and the reading speed is adjusted during scanning the unrecorded area. Hence at the start of the recorded area the read circuit 53 is locked in to the speed of the recorded data. In particular, the address detector 50 is arranged for reading record carrier information, (e.g. position information and recording control data), from the bi-phase modulated servo signals. A suitable embodiment of the address detector is described above with reference to FIG. 4, but other demodulators for the bi-phase modulated servo signals may be used. The address detector further has a word detection unit for retrieving the words of record carrier information, as described with reference to FIG. 3. The beginning of such a word is detected from a predetermined number of inverted wobbles as shown in the upper trace of FIG. 2, after a long sequence of non modulated wobbles. The occurrence of a data bit is detected based on one inverted wobble followed by three not-modulated wobbles.

FIG. 6 shows a device for writing information on a record carrier according to the invention of a type which is (re) writable in, for example a magneto-optical or optical manner (i.e., via phase change or dye) by means of a beam 65 of electromagnetic radiation. The device is also equipped for reading and comprises the same elements as the apparatus for reading described above with FIG. 5, except that it has a write/read head 62 and recording control means which comprise the same elements as the read control means, except for a write circuit 60 that comprises, for example, a formatter, an error encoder and a channel encoder. The write/read head 62 has the same function as the read head 52 together with a write function and is coupled to the write circuit 60. The information presented to the input of the write circuit 60 (i.e., indicated by the arrow 63) is distributed over logical and physical sectors according to formatting and encoding rules and converted into a write signal 61 for the write/read head 62. The system control unit 56 is arranged for controlling the write circuit 60 and for performing the position information recovery and positioning procedure as described above for the reading apparatus. During the writing operation, marks representing the information are formed on the record carrier. The recording control means are arranged for detecting the periodic variations, for example by locking a phase locked loop to the periodicity thereof. A predetermined, fixed number of channel bits is recorded corresponding to each instance of the periodic characteristics, (e.g. 32 channel bits for a wobble). Hence, during recording of a block, the recording of the marks representing the information is synchronized exactly to the corresponding wobble. In an embodiment of the writing device, the positioning unit is arranged for positioning of blocks to be recorded based on the exact correspondence of the length of the wobble to a predetermined number of channel bits, and comprises calculation unit arranged for calculating said position based on the relation between the ADIP word and the address of the information block, (e.g. according to the DVD format as described with reference to FIG. 3).

In an embodiment the reading and/or writing device comprises a phase locked loop, for example, accommodated in the address detector, which phase locked loop is locked to the periodic variations of the track, such as the wobble, during scanning. After a jump of the head 52,62 to a new scanning location the phase locked loop may be preset to the data clock value at the new location, or the bandwidth of said phase locked loop may be increased to lock quickly to the new wobble frequency.

Although the invention has been explained by embodiments using a wobble modulation, any other suitable parameter of the track may be modulated, (e.g. the track width). Also for the record carrier an optical disc has been described, but other media, such as a magnetic disc or tape, may be used. Further, the invention lies in each and every novel feature or combination of features described above.

What is claimed is:

1. A record carrier comprising a servo track including an information track for recording information blocks represented by marks having lengths expressed in channel bits, wherein said servo track has a periodic variation of a physical parameter, which periodic variation is modulated for encoding record carrier information, wherein said modulation is a bi-phase modulation in which a data bit of the record carrier information is encoded by a first predetermined number of variations of a first phase followed by a second predetermined number of variations of a second phase inverse to the first phase, wherein said second predetermined number is the same as said first predetermined number.

2. A record carrier comprising:
a servo track, said servo track including an information track, said information track for recording information blocks, said information blocks represented by marks having lengths expressed in channel bits, wherein said servo track has a periodic variation of a physical parameter, wherein said periodic variation is modulated for encoding record carrier information, wherein said modulation is a bi-phase modulation in which a data bit of the record carrier information is encoded by a first predetermined number of variations of a first phase followed by the same number of variations of a second phase, wherein said second phase is inverse to the first phase; and
wherein said servo track is subdivided into relatively small parts having said bi-phase modulation, and relatively large parts having not modulated periodic variations.

3. A record carrier comprising:
a servo track, said servo track including an information track, said information track for recording information blocks, said information blocks represented by marks having lengths expressed in channel bits, wherein said servo track has a periodic variation of a physical parameter, wherein said periodic variation is modulated for encoding record carrier information, wherein said modulation is a bi-phase modulation in which a data bit of the record carrier information is encoded by a first predetermined number of variations of a first phase followed by the same number of variations of a second phase, wherein said second phase is inverse to the first phase;
wherein said servo track is subdivided into relatively small parts having said bi-phase modulation, and relatively large parts having not modulated periodic variations; and
wherein said small parts comprise a sync part and a data part, the sync part further comprising at least one variation of a phase inverse to the phase of the not modulated periodic variations.

4. A record carrier comprising:
a servo track, said servo track including an information track, said information track for recording information blocks, said information blocks represented by marks having lengths expressed in channel bits, wherein said servo track has a periodic variation of a physical parameter, wherein said periodic variation is modulated for encoding record carrier information, wherein said modulation is a bi-phase modulation in which a data bit of the record carrier information is encoded by a first predetermined number of variations of a first phase followed by the same number of variations of a second phase, wherein said second phase is inverse to the first phase;
wherein said servo track is subdivided into relatively small parts having said bi-phase modulation, and relatively large parts having not modulated periodic variations;

wherein said small parts comprise a sync part and a data part, the sync part further comprising at least one variation of the second phase inverse to the first phase of the not modulated periodic variations; and a word sync data part, wherein said word sync data part further comprises:
   a second predetermined number of periodic variations of the first phase of the not modulated periodic variations; and
   the same predetermined number of said periodic variations of a second phase, inverse to the first phase of the not modulated periodic variations, for indicating a record carrier information word.

5. Record carrier as claimed in claim 1, wherein said first predetermined number of variations of a first phase is 2.

6. A record carrier comprising:
   a servo track, said servo track including an information track, said information track for recording information blocks, said information blocks represented by marks having lengths expressed in channel bits, wherein said servo track has a periodic variation of a physical parameter, wherein said periodic variation is modulated for encoding record carrier information, wherein said modulation is a bi-phase modulation in which a data bit of the record carrier information is encoded by a first predetermined number of variations of a first phase followed by the same number of variations of a second phase, wherein said second phase is inverse to the first phase;
   wherein said servo track is subdivided into relatively small parts having said bi-phase modulation, and relatively large parts having not modulated periodic variations; and
   wherein said small parts have 8 periodic variations and said large parts have 85 periodic variations.

7. Record carrier as claimed in claim 1, wherein the length of one periodic variation corresponds to a third predetermined number of channel bits.

8. Record carrier as claimed in claim 7, wherein the third predetermined number is 32.

9. A recording and/or playback device comprising:
   means for at least one of writing and reading information blocks represented by marks having lengths expressed in channel bits in an information track on a record carrier that comprises a servo track indicating the information track;
   means for scanning the servo track and retrieving record carrier information encoded in a modulation of a periodic variation of a physical parameter at least one fractional portion of the servo track, said fractional portion being less than the entire servo track, wherein the device comprises bi-phase demodulation means for retrieving data bits of the record carrier information from a first predetermined number of variations of a first phase followed by the same number of variations of a second phase inverse to the first phase.

10. The device as claimed in claim 9, wherein the bi-phase demodulation means are adapted for synchronizing to a sync part, said sync part comprising at least one variation of a phase inverse to the phase of a not modulated periodic variations, the servo track being subdivided in relatively small parts having said bi-phase modulation and said sync part, and relatively large parts having said not modulated periodic variations.

11. Device as claimed in claim 10, wherein the device comprises address detection means for detecting an address of a part of the track from a number of the data bits from a record carrier information word, a word sync data part comprising a second predetermined number of periodic variations of the phase of the not modulated periodic variations and the sync part comprising the same number of periodic variations of a phase inverse to the phase of the not modulated periodic variations for indicating the record carrier information word.

12. A recording and/or playback device comprising:
   means for at least one of writing and reading information blocks, wherein said information blocks are represented by marks having lengths expressed in channel bits in an information track on a record carrier, wherein said record carrier includes a servo track indicating the information track;
   means for scanning the servo track;
   means for retrieving record carrier information encoded in a modulation of a periodic variation of a physical parameter of the servo track;
   bi-phase demodulation means for retrieving data bits of the record carrier information from a first predetermined number of variations of a first phase, followed by the same number of variations of a second phase, wherein said second phase is inverse to the first phase; and
   recording positioning means for positioning an information block to be recorded at a record location, said record location based on the physical location of one of the periodic variations corresponding to an address of said information block, said record location calculated from the length of one periodic variation corresponding to a third predetermined number of channel bits.

13. Method of manufacturing a record carrier, in which the record carrier is provided with a servo track indicating an information track intended for recording information blocks represented by marks having lengths expressed in channel bits, which servo track is provided with at least one fractional portion, said fractional portion being less than the entire servo track, including a periodic variation of a physical parameter which periodic variation is modulated for encoding record carrier information, characterized in that a data bit of the record carrier information is encoded by a first predetermined number of variations of a first phase followed by the same number of variations of a second phase inverse to the first phase.

14. A record carrier comprising:
   a servo track including an information track, said information track for recording information blocks, said information blocks represented by marks having lengths expressed in channel bits, wherein said servo track has a periodic variation of a physical parameter, wherein said periodic variation is modulated for encoding record carrier information according to bi-phase modulation in which a data bit of the record carrier information is encoded by a first predetermined number of variations of a first phase, followed by the same number of variations of a second phase inverse to the first phase, wherein the servo track is subdivided in relatively small parts having said bi-phase modulation, and relatively large parts having not modulated periodic variations.

15. The record carrier of claim 14, wherein said relatively large parts constitute at least 90 percent of said servo track.

16. The record carrier of claim 14, wherein the small parts further comprise a sync part and a data part, the sync part comprising at least one variation of a phase inverse to the phase of the not modulated periodic variations.

17. The record carrier of claim 14, wherein the servo track further comprises:
  a first word sync part for a data bit, said first word sync part comprising:
    a second predetermined number of periodic variations of the phase of the not modulated periodic variations, and
  a second word sync part for indicating a record carrier information word comprising:
    the same second predetermined number of periodic variations of a phase inverse to the phase of the not modulated periodic variations.

18. The record carrier of claim 14, wherein said first predetermined number of variations of a first phase is 2.

19. The record carrier of claim 15, wherein the small parts have 8 periodic variations and the large parts have 85 periodic variations.

20. The record carrier of claim 14, wherein the length of one periodic variation corresponds to a third predetermined number of channel bits.

21. The record carrier of claim 20, wherein the third predetermined number is 32.

22. A recording and/or playback device comprising:
  writing/reading means for at least one of writing and reading information blocks represented by marks having lengths expressed in channel bits in an information track on a record carrier that comprises a servo track indicating the information track;
  scanning means for scanning the servo track and retrieving record carrier information encoded in a modulation of a periodic variation of a physical parameter of the servo track;
  bi-phase demodulation means for retrieving data bits of the record carrier information from a first predetermined number of variations of a first phase followed by the same number of variations of a second phase inverse to the first phase, wherein said bi-phase demodulation means are adapted for detecting relatively small parts of the servo track, said relatively small parts having said bi-phase demodulation and located among relatively large parts, said relatively large parts having not modulated periodic variations.

23. The device as claimed in claim 22, wherein said bi-phase demodulation means are adapted for synchronizing to a sync part, said sync part further comprising at least one variation of a phase inverse to the phase of the not modulated periodic variations.

24. The device as claimed in claim 22, wherein the device further comprises:
  address detection means for detecting an address of a part of the information track, from a number of the data bits from a record carrier information word, by detecting a word sync part, wherein said word sync part for a data bit comprises a second predetermined number of periodic variations of the phase of the not modulated periodic variations, and wherein said word sync part for indicating a record carrier information word comprises the same number of periodic variations of a phase inverse to the phase of the not modulated periodic variations.

25. The device as claimed in claim 22, wherein the device further comprises:
  recording positioning means for positioning an information block to be recorded at a record location, said record location based on the physical location of one of the periodic variations corresponding to an address of said information block, said record location calculated from the length of one periodic variation corresponding to a third predetermined number of channel bits.

26. A method of manufacturing a record carrier, said method comprising:
  providing said record carrier with a servo track, wherein said servo track indicates an information track intended for recording information blocks represented by marks having lengths represented in channel bits;
  providing said servo track with a periodic variation of a physical parameter, wherein said periodic variation is modulated for encoding record carrier information;
  encoding a data bit of the record carrier information by a first predetermined number of variations of a first phase, followed by the same number of variations of a second phase inverse to the first phase, wherein said servo track is subdivided in relatively small parts having said bi-phase modulation, and relatively large parts having not modulated periodic variations.

\* \* \* \* \*